United States Patent Office 3,575,850
Patented Apr. 20, 1971

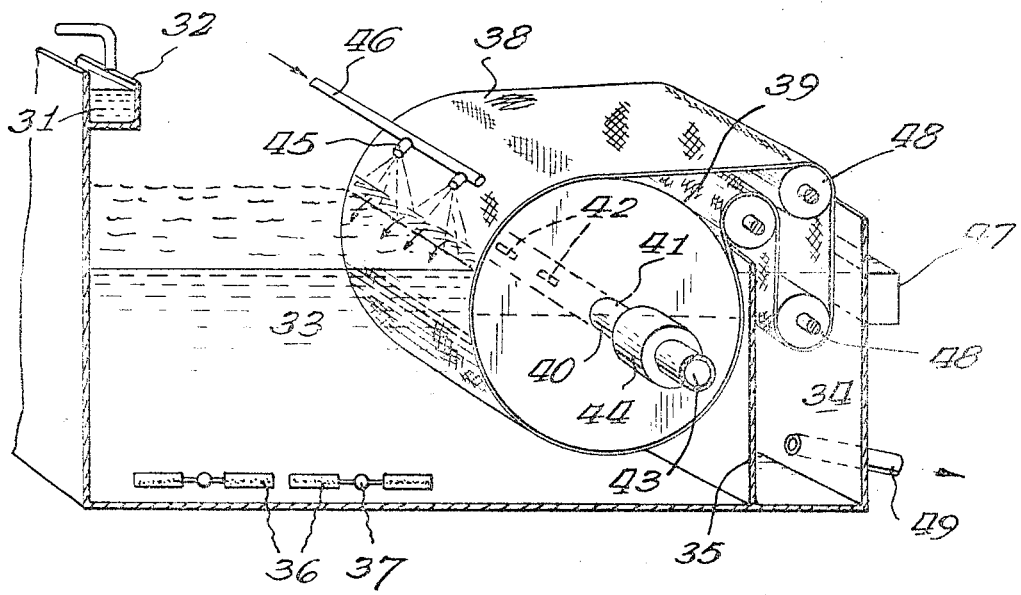

3,575,850
METHOD AND APPARATUS FOR TREATING
WASTE MATERIALS
Roger Davidson, Arlington Heights, Ill., and Fumio F. Sako, San Jose, Warren G. Palmer, Saratoga, and Robert A. Fisher, Los Gatos, Calif., assignors to FMC Corporation
Filed July 7, 1969, Ser. No. 839,379
Int. Cl. C02c 1/12
U.S. Cl. 210—15
11 Claims

ABSTRACT OF THE DISCLOSURE

The method of treating waste materials such as sewage involves introducing raw sewage into a body of aqueous medium, aerating said body of aqueous medium, withdrawing a sufficient volume of substantially solids free liquid through a perforate drum supported filter which is partially submerged in said body of aqueous medium to compensate for the volume of influent waste material and thereby maintain a relatively constant volume for said body of aqueous medium, accumulating solids on the movable filter operating so that it filters out solids while passing the substantially solids free liquid and transporting the solids accumulated on said screen to a point of disposal where the solids are dislodged from the screen.

This invention relates to the treatment of waste materials. More particularly, it relates to aerobic treatment of sewage. Still more particularly, it relates to a method and apparatus for reducing the Biochemical Oxygen Demand of an aqueous medium containing sewage and for controlling the sludge solids content in the aeration tank.

Briefly, the process of this invention comprises introducing aqueous sewage suspension into a body of aqueous liquor to form a composite of aqueous materials, aerating said composite, separating solids from said composite in an area in said composite removed from the area of introduction of sewage suspension, on a porous medium which transports said solids to a zone where suitable disposition is made thereof, dislodging said solids from said porous medium and returning said porour medium for separation of additional solids, accumulating aqueous medium which passes through said porous medium in a segregated zone below the normal level of said body of aqueous liquor as a clarified liquid and discharging said clarified liquid in quantities to maintain a relatively constant volume for said composite of aqueous materials.

An apparatus for treating sewage in accordance with this process may consist of an aeration tank for aqueous sewage, a perforate drum mounted for at least partial submergence in said aqueous sewage, a continuous screen which is guided through said aeration tank in contact with said perforate drum to accumulate solids thereon and is movable to carry said accumulated solids out of said aeration tank, means for dislodging the accumulated solids from said screen in an area outside of said tank, means for guiding said screen back to the drum in said aeration tank and means for discharging therefrom clarified liquid which passes through said screen and is accumulated in said drum.

BACKGROUND OF THE INVENTION

In the treatment of waste materials, such as raw sewage having the insoluble solids thereof in suspension or colloidal form, the sewage is generally delivered to an aeration tank. By aerating the mixture, at atmospheric or at elevated temperatures to culture the microorganisms present, removal of an appreciable portion of the Biochemical Oxygen Demand (B.O.D.) may be effected. Such processes, if not seeded with microorganisms, require extended startup time before effective B.O.D. removal occurs and the extent of B.O.D. removal is generally of 60%.

In patents such as No. 3,337,448, Rich suggests elimination of a settling tank by sterilizing the aqueous suspension withdrawn from the aeration zone and discharging sterilized suspension overboard. The discharge of such solids suspensions still containing significant amounts of B.O.D. from ships while in inland streams or lakes or in the water of a port is not permitted by maritime regulations.

Removal of B.O.D. may be accomplished at a faster rate and to a greater extent if the raw sewage is delivered to an aeration tank where it is commingled with microorganisms in the form of sludge recycled from a final or settling tank as is done in so-called activated sludge plants. In the activated sludge plants, while oxygen utilization and rates of B.O.D. removal are improved, rates of concentrating sludge in the settling tank has always been a prime factor in determining the efficiency of the process. This has been one of the major drawbacks to use of the process aboard ships because the ship movement, particularly in rough seas, tends to cause liquid movement in the settling tanks which interferes with the settling operation. Additionally, the handling of mixed liquor, settling the sludge therefrom, and recycling of sludge concentrates has required equipment markedly adding to the cost of a treatment plant.

Now it has been discovered that sewage can be processed for significant reductions in Biochemical Oxygen Demand (B.O.D.) in an aerobic process by effecting separation of the solids directly from a portion of the suspension in the aeration tank while continuing to aerate the suspension of solids and maintaining turbulent liquid conditions in the aeration tank, so that a relatively solids free liquid can be produced for discharge without need for a settling tank and a predetermined quantity of sludge may be seperated for disposal. The process is particularly adaptable for marine usage where the disposal of sludge may take many forms where it may not be desirable to discharge the solids suspensions from a vessel.

In accordance with this invention, a method of treating sewage is provided which involves a combination of aerating an agitated aqueous suspension of sewage solids and while continuing aeration and agitation of the aeration tank contents over a period of 1 to 24 hours, effecting a separation of a portion of the suspension into a clarified aqueous medium and accumulated solids for separate withdrawal from the aeration zone, said withdrawal providing the means whereby a predetermined solids content and a predetermined total of liquid being aerated are maintained. If desired, the aqueous suspension may be aerated while being held at elevated temperatures in the range of, for example, 45° C. to 65° C. and/or at atmospheric or superatmospheric pressures.

Raw sewage is mixed into a liquid in an aeration zone and the sludge solids are removed from the aeration zone for disposal by suitable means such as incineration, digestion, storage for dumping, digestion followed by discharge to sludge beds, etc. The aeration operation may be of the so-called complete mixing type wherein agitation is arranged to accomplish rapid dissemination of incoming waste materials widely in at least that initial portion of the aeration zone adjacent the inlet.

Control over the volume of liquid and the weight of solids in the aeration zone is provided by mounting in a partially submerged position in the mixed liquor in the aeration compartment, a drum having a perforate circumferential surface and closed at the ends and provided with a hollow support hub with ports therein.

Clarified liquid accumulated in this drum, after passage through a filter medium on the peripheral surface of the drum, is discharged through the hub and through suitable flow conducting means such as an overflow pipe, an overflow weir, etc.

The filter medium, in the form of a movable continuous filter screen is guided through the aeration tank by the perforate drum. As liquid passes through the filter screen, sludge solids associated therewith are deposited on the screen. The screen is adapted to transport solids out of the aeration tank.

A suitable material for the continuous screen is woven fabric or woven metallic screening. A particularly useful material is the so-called polyester monofilament screen cloth. Effectiveness of such screen depends upon the size of the pores in the screen and the degrees of agglomeration of solids or sludge in the aeration tank.

When operating with a relatively high solids concentration in the liquid under aeration, a cloth with a weave of 260 x 400 meshes/inch, a nominal hole size of 20 microns, will generally produce, a filtrate with 40 to 80 p.p.m. of solids. A screen of nominal 10 micron hole size will generally produce a filtrate of lesser solids concentration.

The rate of removal of solids is controllable by a number of factors such as speed of the continuous screen, volume flow of liquid through the drum, etc. Preferably, the removal of solids is limited to the weight of solids necessary to maintain a predetermined weight of suspended solids in the aeration tank. However, if excess solids are being accumulated on the screen, solids may be removed from the screen by suitable means such as directing sprays of water or effluent under pressure against the screen to wash a predetermined portion of the solids back into the aeration tank or by suitable scraper means such as doctor blades which can remove solids for return by trough means to the mixed liquor, and the like.

Solids removal on a continuous screen from the suspension in the aeration tank will vary with the solids concentration in the suspension, the effective hydraulic head forcing liquid through the screen and the thickness and type of solids building up on the screen surface. Sludge solids on the screen tend to form a coating with a tendency to resist passage of liquid after solids accumulation has started to occur. Speed of the movable continuous screen provides a means of controlling the thickness of the accumulated layer. Speeds may vary from about 20 inches per minute to 600 inches per minute depending upon the solids concentration in the contents of the aeration zone.

Typical solids removal from a liquid containing 3300 mg./liter of sludge solids from aeration of sewage are 0.48 gram/square foot of belt at a belt speed of 342 inches/minute, 0.57 gram/square foot of belt at a speed of 189 inches/minute and 0.75 gram/square foot of belt at a speed of 80 inches/minute.

After the sludge solids accumulated on the continuous screen are transported out of the aeration tank, they are dislodged from the continuous screen so that the screen can be returned to the aeration tank for removal of additional sludge solids. The manner of dislodging the solids will depend upon the form in which the solids are to be disposed of. If the solids are to be subjected to a digestion operation, the continuous screen and transported solids may be passed through the liquid in a digestion chamber and while submerged therein, the solids can be dislodged preferably by ultrasonic vibrations created by a transducer. If the solids are to be incinerated, the sludge layer may be removed from the screen as a wet solid mass by doctor blades, a pickup roller, etc. and discharged into a trough where suitable means such as a continuous screw impeller, a scraper, etc., moves the solids to their ultimate destination. To insure that the screen is not blinded by solids remaining after removal of the sludge layer by such means as a roller, the screen, before return to the aeration zone, is usually passed through a body of liquid where ultrasonic vibrations will dislodge the solids embedded in the pores of or adhering to the screen.

A treatment plant of this type is capable of operation to accomplish a wide variety of results. A primary function may be to concentrate B.O.D. in an aerobic digester where it can be stored and oxidized. The plant can also provide for B.O.D. removal by oxidation with short start up times. With further simple adjustments, the plant can provide for high rates of B.O.D. removal through operation with a high solids content of sludge, while maintaining a mixed liquor suspended solids concentration in the areation tank under direct control without the need for quiescent conditions necessary for conventional solids separation by settling.

When referring to aeration, it will be understood that this term is intended to mean either introduction of air under pressure, or gaseous oxygen in relatively pure form, so-called "atomic oxygen" which may be oxygen containing ozone, nascent oxygen freed, for example, by peroxide agents such as hydrogen peroxide and calcium peroxide, and the like.

The invention will be further understood from the following description of a preferred embodiment of the invention taken in conjunction with the accompanying drawings in which:

FIG. 1 is a vertical sectional view of a structure showing contiguous aeration and cleaning tanks and a continuous screen running through both tanks.

FIG. 2 is a perspective view of an aeration tank and a tank for concentration of solids to be wasted and spray means to return solids picked up on the screen in excess of the amount desired for wasting to the aeration tank.

In FIG. 1, the numeral 10 indicates a tank of suitable material of construction. Sewage is introduced into tank 10 through influent channel 11 which permits distributed flow into the tank over a weir 12. Tank 10 is divided into an aeration compartment 13 and a digestion compartment 14 by a wall 15.

Aeration in tank portion 13 is effected by introduction of air through dispersers 16 for a period of one to three hours. Dispersers 16 are supported by their communications with a header 17 which delivers air from a source under pressure that is not shown.

Solids suspended in the liquid in aeration compartment 13 are deposited on one side of a movable endless screen 18. Endless screen 18 is in contact with a rotatable drum 19. Rotatable drum 19 is mounted in a partially submerged position in aeration compartment 13. The screen is power driven, by motor means, which are not shown, around idler pulleys 20. Solids are transferred by the moving screen to digestion compartment 14 where the solids are removed, preferably by an ultrasonic transducer 22. After the solids are so removed, the screen 18 is directed by means of another idler pulley 20 to the aeration compartment 13 where it begins another cycle.

In the embodiment of FIG. 2, the numeral 30 indicates a tank into which sewage is introduced through influent channel 31 which permits flow into the tank over a weir 32. Tank 30 is divided into an aeration compartment 33 and a solids accumulation compartment 34 by a wall 35.

In this embodiment, intended for carrying out an activated sludge type operation wherein a mixed liquor solids content, generally in the range of, for example, 1500 to 10,000 p.p.m., although even higher or lower solids contents may be utilized, is to be maintained, aeration is effected by introducing air into compartment 33 through dispersers 36 for a period of 2 to 6 hours. Dispersers 36 are supported by their communication with a header 37 which delivers air from a source that is not shown.

Solids suspended in the liquid in aeration compartment 33 are deposited on one side of a movable endless screen 38. Endless screen 38 is in contact with the peripheral area of rotatable drum 39 which has a perforate peripheral area. Rotatable drum 39 is mounted in a partially submerged position in the aeration compartment, i.e., so that the level of mixed liquor in the aeration tank is above the outlet port for clarified liquid within the drum, in this instance the central shaft 40 of drum 39, which shaft has a central axial passage 41 therein and is provided with ports 42 communicating with said passage. Shaft 40 communicates with outlet pipe 43 through a suitable packing gland or rotating seal 44..

As the endless screen 38 emerges from the mixed liquor, the solids coated surfaces comes into a zone where suitable solids removal means is operating, for example, water sprays in the screen, to dislodge the solids layer. Water spray is directed against the surface from jet nozzles 45 which communicate with a water supply pipe 46. Water sprayed from jet nozzles 45 under pressure, dislodge the solids layer adhering to the screen and returns the solids, i.e., washes them back into the aeration tank.

The jet nozzles 45 can be positioned to span all or any predetermined portion of the width of the screen. If the jet span the entire width, their operation is preferably intermittent so that the screen 38 will carry some solids to the accumulation compartment 34 periodically. Solids remaining on the moving screen as it submerges in the liquid in the accumulation compartment 34 are dislodged preferably by an ultrasonic transducer 47, i.e., by sonic vibrations.

Movable screen 38 is power driven, by motor means, which are not shown, around idler pulleys 48. After the solids are dislodged, the screen 38 is directed by means of another idler pulley 48 to the aeration compartment 33 where it begins another cycle.

Solids concentrated in compartment 34 are discharged through conduit 49.

When sewage is to be treated in equipment of the type illustrated in FIG.. 1, at a design rate of approximately 1750 gallons of raw sewage per day, the volume of aqueous sewage being held under aeration for a 3 hour average aeration period, will require an aeration tank volume of approximately 50 cubic feet when allowing for about 40% head space..

The digester volume will be approximately the same as the aeration tank, i.e., 50 cubic feet, i.e., 4 feet long, 2½ feet wide and 5 feet deep.

The drum 19 and continuous screen 18 operating in such an aeration tank will have a width of approximately 2 cubic feet.

When the B.O.D. loading is about 290 pounds of B.O.D. per day per 1000 cubic feet of aeration tank capacity and the air throughput for aeration will be approximately 13 s.c.f.m.

When the continuous screen is a polyester monofilament screen cloth with a weave of 260 x 400 meshes/inch, a nominal pore size of 20 microns, and the suspended solids in the aeration tank total approximately 500 mg./liter, an effluent may be produced containing approximately 20 mg./liter of B.O.D. Sludge solids accumulated on the screen may be wasted to the digester compartment 14 in an amount equal to about 7 to 10 pounds dry weight solids per day.

When sewage is to be treated in equipment of the type illustrated in FIG. 2, at the design rate of 10,000 gallons of influent raw sewage per day, the aeration tank to hold a mixed liquor having a solids content maintained at approximately 3000 p.p.m. which will be aerated for an average of 4 hours, will have a volume of approximately 290 cubic feet.

The continuous screen operating in the aeration tank having around a drum of diameter of 3 feet and a width of approximately 3 feet may be washed clear of solids for 40 minutes out of each hour of tank aeration using jets directing 3 gallons per minute of clarified effluent against the continuous screen.

When the B.O.D. loading is about 100 pounds of B.O.D. per day per 1000 cubic feet of aeration tank capacity, effluent separated through the perforate drum can be discharged at a rate of approximately 1600 liters per hour having less than 20 mg. per liter of B.O.D.

Sludge removed during the 20 minute periods of transfer to an accumulation tank on the continuous screen operating at a speed of 120 inches per minute will generally be accumulated on the continuous screen in an amount in the range between 0.65 gram and 0.85 gram per square foot of screen surface. These solids may be dislodged into a body of water in a solids accumulation zone from which a slurry of 2% solids content can be periodically discharged.

We claim:

1. A process for the treatment of waste material to produce a sludge and a relatively low B.O.D. content effluent comprising introducing influent aqueous waste suspension into a body of aerated aqueous material held in a treatment zone, injecting oxygen-containing gas into said aqueous material in quantities to substantially reduce the B.O.D. through support of microorganism growth and to maintain the solids in suspension, separating solids from said aerated aqueous material in an area in the body of said aqueous material removed from the area of introduction of influent aqueous waste by accumulation as a layer on a movable porous medium which, after emerging from said aerated aqueous material, transports at least the major part of the accumulated layer out of said aeration zone to a zone for disposition, dislodging said solids from said porous medium and returning said porous medium for separation of additional solids, accumulating aqueous liquid which passes through said porous medium while said porous medium is submerged, in a segregated zone below the normal surface level of said body of aqueous liquor, as a clarified liquid of relatively low B.O.D. and discharging said clarified liquid in quantities to maintain a relatively constant volume for the body of aqueous material.

2. A process according to claim 1 wherein the influent aqueous waste suspension is raw sewage and aerating is for a period of 1 to 3 hours.

3. A process according to claim 1 wherein a portion of the solids layer accumulated on the movable porous medium and being transported out of the aeration zone are dislodged before the porous medium moves completely out of the aeration zone and are reincorporated into the aqueous liquor.

4. A process according to claim 3 wherein dislodging of the solids from the movable porous medium is by the stripping action of jets of aqueous medium.

5. A process according to claim 1 wherein the aqueous liquor is a so-called mixed liquor and aerating is for a period of 2 to 6 hours.

6. A process according to claim 1 wherein the separating of solids is at a rate to maintain a predetermined level of solids in said aqueous liquor and disposition of the removed solids is to waste.

7. A process according to claim 1 wherein said movable porous medium transports the accumulated layer of solids into a submerged position in a liquid in a sludge digestion zone and dislodging of the solids is accomplished by sonic vibrations.

8. An apparatus for treating sewage comprising a tank for aqueous sewage, means for introducing oxygen-containing gas in said tank for aerating the aqueous sewage content, a perforate drum mounted for at least partial submergence in said aqueous sewage, a continuous screen having pores of an average size up to 20 microns which is guided through said tank in contact with said perforate drum whereby solids accumulate thereon while clarified liquid passes therethrough into said perforate drum, said continuous screen being movable to carry said accumulated solids out of said tank, solids layer removal means located above the aqueous liquid level in said tank adapted to remove at least a portion of the accumulated solids from said continuous screen after it emerges from said aqueous sewage and return the removed solids to the aqueous sewage in said tank, means for dislodging said accumulated solids from said screen in an area outside of said tank, means for guiding said screen back to said drum in said tank and means for discharging clarified liquid accumulated in said drum.

9. An apparatus according to claim 8 wherein said continuous screen is a polyester monofilament woven cloth with average pore size in the range between about 10 and 20 microns.

10. An apparatus according to claim 8 wherein the solids layer removal means are nozzles for discharging a liquid against said continuous screen.

11. An apparatus according to claim 8 wherein a separate liquid holding tank is positioned contiguous to said tank for aqueous sewage and said continuous screen moves through the liquid in both the tank for aqueous sewage and said liquid holding tank and said means for dislodging solids from said continuous screen is an ultrasonic transducer positioned to send shock waves against said screen while said screen is submerged in the liquid in said liquid holding tank.

References Cited
UNITED STATES PATENTS

| | | | |
|---|---|---|---|
| 1,967,310 | 7/1934 | Kent | 210—221X |
| 3,305,481 | 2/1967 | Peterson | 210—19 |

JAMES L. DECESARE, Primary Examiner

U.S. Cl. X.R.

210—220, 401, 526